(12) United States Patent
Yoshio et al.

(10) Patent No.: US 8,655,157 B2
(45) Date of Patent: Feb. 18, 2014

(54) CONTENT REPRODUCTION APPARATUS AND CONTENT REPRODUCTION SYSTEM

(71) Applicant: Sony Corporation, Tokyo (JP)

(72) Inventors: Taichi Yoshio, Kanagawa (JP); Roka Ueda, Tokyo (JP); Takashi Onohara, Tokyo (JP); Yuji Kawabe, Tokyo (JP); Eri Sakai, Saitama (JP); Keishi Daini, Kanagawa (JP); Takuma Higo, Tokyo (JP); Seizi Iwayagano, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/792,907

(22) Filed: Mar. 11, 2013

(65) Prior Publication Data

US 2013/0243390 A1    Sep. 19, 2013

(30) Foreign Application Priority Data

Mar. 15, 2012    (JP) .................................. 2012-058229

(51) Int. Cl.
*H04N 5/76*    (2006.01)

(52) U.S. Cl.
USPC .......................................................... 386/338

(58) Field of Classification Search
USPC .................................. 386/200, 338, 339, 340
See application file for complete search history.

(56) References Cited

U.S. PATENT DOCUMENTS

2007/0219937 A1*    9/2007    Lee et al. .......................... 707/1

FOREIGN PATENT DOCUMENTS

| JP | 2005-193874 | 7/2005 |
| JP | 2010-212775 | 9/2010 |

* cited by examiner

*Primary Examiner* — Huy T Nguyen
(74) *Attorney, Agent, or Firm* — Oblon, Spivak, McClelland, Maier & Neustadt, L.L.P.

(57) ABSTRACT

Disclosed herein is a content reproduction apparatus including: a reproduction block configured to reproduce video content; a display block configured to display the reproduced video content; a communication block configured to transmit the video content to a portable reproduction apparatus by wireless communication; a speaker block having at least one first speaker located in proximity and at least one second speaker located in the proximity of the portable reproduction apparatus; and an audio output control block configured to control a reproduction state of the speaker block. In a state where the video content is displayed on the display block, each of the first speaker and the second speaker reproduces audio content related with the video content. In a content non-share state, the audio output control block controls audio output such that the second speaker does not reproduce audio content related with the video content.

7 Claims, 9 Drawing Sheets

CONTENT REPRODUCTION APPARATUS AND CONTENT REPRODUCTION SYSTEM

BACKGROUND

The present disclosure relates to a content reproduction apparatus and a content reproduction system.

As one of car-mounted content reproduction apparatuses (or so-called car audio systems), an apparatus having a disk reproduction function is known. Reproduced video is displayed on a display monitor of a car navigation apparatus for example. In order to provide the viewing of reproduced video at the rear seat of a car, a rear monitor installed at the rear seat and the content reproduction apparatus need be connected with each other with a cable, thereby making the installation work cumbersome due to installation restrictions.

Japanese Patent Laid-open No. 2007-160974 (referred to as Patent Document 1) discloses a technique in which multiview displays for separately presenting video to two or more passengers are arranged to separately supply the audio corresponding to displayed video to speakers. In addition, Japanese Patent Laid-open No. 2010-130674 (referred to as Patent Document 2) discloses a technique in which wireless communication is established between a car-installed apparatus and a portable terminal, thereby connecting each other in a coordinated manner.

SUMMARY

Patent documents 1 and 2 above have no reference to the switching between in-vehicle sharing and non-sharing of video content for example. It should be noted that the function enabling a user to specify the switching between sharing and non-sharing from a user terminal significantly enhances user convenience. For example, the specification of this switching allows the user to activate a desired application software program, a game software program for example, from a state in which video content is shared with other users.

Therefore, the present disclosure addresses the above-identified and other problems associated with related-art methods and apparatuses and solves the addressed problems by providing a content reproduction apparatus and a content reproduction system that are configured to easily switch between a shared state and a non-shared state.

In carrying out the disclosure and according to one embodiment thereof, there is provided a content reproduction apparatus. This content reproduction apparatus has a reproduction block configured to reproduce video content; a display block configured to display the reproduced video content; a communication block configured to transmit the video content to a portable reproduction apparatus by wireless communication; a speaker block having at least one first speaker located in proximity and at least one second speaker located in the proximity of the portable reproduction apparatus; and an audio output control block configured to control a reproduction state of the speaker block. In this configuration, in a state where the video content is displayed on the display block, if the portable reproduction apparatus is in a content share state where the portable reproduction apparatus displays the video content, each of the first speaker and the second speaker reproduces audio content related with the video content and, in a content non-share state, the audio output control block controls audio output such that the second speaker does not reproduce audio content related with the video content.

In carrying out the disclosure and according to another embodiment thereof, there is provided a content reproduction system. This content reproduction system is made up of a content reproduction apparatus and a portable terminal. The content reproduction apparatus has a reproduction block configured to reproduce video content; a first display block configured to display the reproduced video content; a first communication block configured to transmit the video content to a portable reproduction apparatus by wireless communication; a speaker block having at least one first speaker located in proximity and at least one second speaker located in the proximity of the portable reproduction apparatus; and an audio output control block configured to control a reproduction state of the speaker block. The portable terminal has a second communication block configured to receive the video content by wireless communication; and a second display block configured to display the received video content. In this configuration, in the content share state where, in a content share state where the portable reproduction apparatus displays the video content on the second display block, each of the first speaker and the second speaker reproduces audio content related with the video content and, in a content non-share state, the audio output control block controls audio output such that the second speaker does not reproduce audio content related with the video content.

The present disclosure does not require the cable connection of display blocks, are not restrictive in installation, and uses users' portable terminals, thereby eliminating the installation cost. In coordination with sharing and non-sharing of video content, audio content related with the video content can be automatically turned on/off, thereby preventing the undesired audio reproduction in the non-share state. In addition, the share and non-share states can be switched between from the side of portable terminals as required.

DETAILED DESCRIPTION OF THE PREFERRED EMBODIMENTS

The embodiments to be described below are suitable specific examples of the present disclosure and restricted in various technologically preferable matters. However, the scope of the present disclosure shall not be limited to the following embodiments unless especially noted otherwise.

1. EMBODIMENTS

[Content Reproduction Apparatus]

Figure 1:
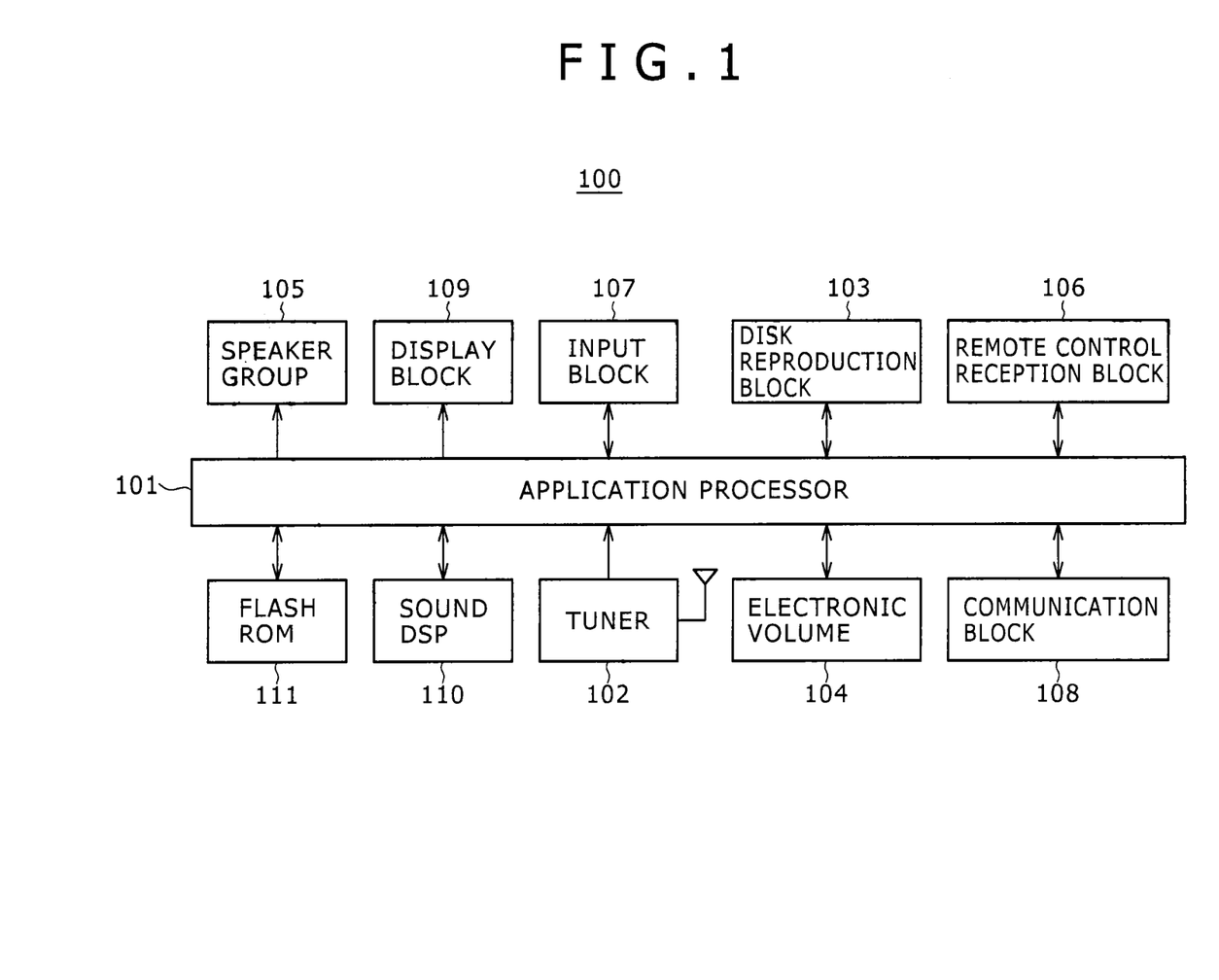
FIG. 1 is a block diagram illustrating an exemplary configuration of a content reproduction apparatus practiced as one embodiment of the present disclosure.

Now, referring to FIG. 1, one example of a content reproduction apparatus 100 for use on vehicle is described. The content reproduction apparatus 100 is mounted on the dashboard of a car for example. The content reproduction apparatus 100 has an application processor 101 having a function of controlling the entire content reproduction apparatus 100. An application processor is a generic name a semiconductor with basic applications built in a CPU (Central Processing Unit) of the semiconductor. Typically, an application processor includes a CPU and peripheral devices thereof and parts of middleware and applications for use in a portable terminal, for example.

It should be noted that a portable terminal denotes a terminal that is portable or mobile as contrasted by a stationary terminal. To be more specific, portable terminals include so-called smartphones, tablet-type personal computers, and portable game machines, for example. In addition, in one embodiment of the present disclosure, the content reproduction apparatus 100 has one application processor 101; however, it is also practicable to arrange a CPU for executing a partial function in the content reproduction apparatus 100. For example, an existing CPU may execute the processing that is otherwise executed by an existing in-vehicle audio apparatus.

Two or more component elements are connected to the application processor 101 of the content reproduction apparatus 100. For one example, a tuner 102, a disk reproduction block 103, an electronic volume 104, a speaker group 105, a remote control reception block 106, an input block 107, a communication block 108, a display block 109, a sound DSP (Digital Signal Processor) 110, and a flash ROM (Read Only Memory) 111 are connected to the application processor 101. The speaker group 105 includes those arranged in the proximity of the front seat of a vehicle and others arranged in the proximity of the rear seat.

The tuner 102 receives radio broadcast signals to execute demodulation, analog-to-digital conversion, and data decoding on the received radio broadcast signals, thereby restoring radio audio data. Under the control of the application processor 101, the radio audio data is adjusted in volume by the electronic volume 104 to be supplied to the speaker group 105, thereby being outputted from the speaker group 105 as sound. Under the control of the application processor 101, the electronic volume 104 amplifies the audio signals supplied from the tuner 102, the disk reproduction block 103 and so on to adjust the volume of the sound.

The sound DSP 110 processes a digital audio signal and is capable of controlling the sound image localization of a reproduced audio signal in response to a control signal entered from the input block 107 or generated in the application processor 101. To be more specific, the sound DSP 110 can control both the sound image localization in the depth direction and the sound image localization in the width direction. For example, providing sound image localization at a center position in an vehicle allows the user to hear reproduced sound almost uniformly, regardless of the position of user seat. Providing sound image localization at a forward position in a vehicle mainly allows the user at a front seat to hear reproduced sound.

The disk reproduction block 103 is capable of reproducing various types of disk recording media. To be more specific, the disk reproduction block 103 is capable of reproducing disk media including CD (Compact Disc), CD-R (Recordable/CD-RW (ReWritable)), DVD (Digital Versatile Disc) video, DVD-R (DVD-Recordable), and BD (Blu-ray Disc). The disk reproduction block 103 executes processing such as decoding on the signal reproduced from a disk recording media to generate a digital audio signal and a digital video signal. These digital audio signal and digital video signal are supplied to the application processor 101. It should be noted that, although not shown, a USB (Universal Serial Bus) connection terminal may be arranged to enable the reproduction of a compressed digital audio signal stored in a USB memory.

Video information reproduced from a disk recording media is displayed on the screen of the display block 109 connected to the application processor 101. The display block 109 is a display monitor apparatus based on LCD (Liquid Crystal Display), PDP (Plasma Display Panel), organic EL (Electro Luminescence) panel or the like. In addition to reproduced video information, a home screen for displaying various operation menus, music title lists, and information about the music being reproduced (artist names and music titles, for example) are displayed on the display block 109. For the display block 109, the display block of a car navigation system may be used.

The remote control reception block 106 receives a control signal transmitted from a remote control commander attached to the content reproduction apparatus 100 when the user operates the remote control commander and outputs the received control signal to the application processor 101. The input block 107 provides input section for the user to do various input operations. The input block 107 is made up of buttons, a touch panel, and switches, for example. It should be noted that the input block 107 may be configured as a touch screen integrated with the display block 109. When the user operates the input block 107, a corresponding control signal is generated to be outputted to the application processor 101. In accordance with the received control signal, the application processor 101 executes computation and control processing.

The communication block 108 provides wireless communication with a portable terminal 200 of a passenger in the same vehicle. For the communication scheme of the communication block 108, Bluetooth (trademark), wireless HDMI (High Definition Multimedia Interface), Wi-Fi (Wireless Fidelity), millimeter-wave communication, wireless USB, or the like is available. In addition, the communication block 108 may be configured to be compatible with two or more wireless communication schemes. Further, the communication block 108 is configured to execute the transmission of data such as programs, in addition to video data and audio data.

In one embodiment of the present disclosure, video data and audio data reproduced from a disk recording media in the disk reproduction block 103, a DVD for example, can be viewed and heard in both the content reproduction apparatus 100 and the portable terminal 200. In the content reproduction apparatus 100, the video data is displayed on the display block 109 and the audio data is sounded through the speaker group 105. In the portable terminal 200, the video received via wireless communication is displayed on the display block arranged on the portable terminal 200. The audio data is sounded from the speaker of the portable terminal 200 and from the speaker in the proximity of the passenger having the portable terminal 200 or only from the proximity speaker.

The flash ROM 111 is a nonvolatile memory in which various kinds of data such as the information about communication and radio broadcast frequency information are stored. Then, the stored data are supplied to the application processor 101.

[Portable Terminal]

Figure 2:
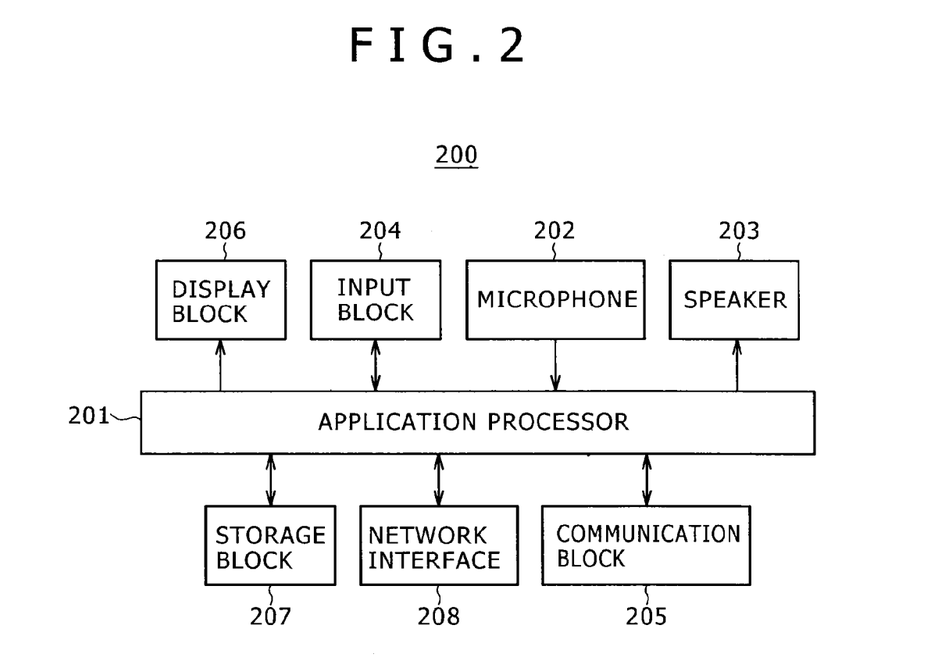
FIG. 2 is a block diagram illustrating an exemplary configuration of a portable terminal practiced as another embodiment of the present disclosure.

Referring to FIG. 2, the following describes one example of the portable terminal 200. The portable terminal 200 is a so-called smartphone of a passenger. The portable terminal 200 has an application processor 201 that controls the entire apparatus. The application processor 201 includes parts of the CPU and the peripheral devices thereof, middleware, and applications for use in the portable terminal.

Two or more component elements are connected to the application processor 201 of the portable terminal 200. For example, a microphone 202, a speaker 203, an input block 204, a communication block 205, a display block 206, a storage block 207, and a network interface 208 are connected to the application processor 201. Through the microphone 202 installed on a part of the case, audio input can be done and, through the speaker 203 installed on the case, audio output can be done. It should be noted that, if the content reproduction apparatus 100 and the portable terminal 200 are in a shared state, the input into the speaker 203 of the portable terminal 200 may be turned off, thereby putting the speaker into an off state.

The icons of various software programs are displayed on the screen of the display block 206 connected to the application processor 201 and a screen corresponding to an activated application is displayed on this screen. In addition, a video transmitted from the content reproduction apparatus 100 and received by the portable terminal 200 is displayed on the screen of the display block 206. In addition to the reproduced video information, a home screen for displaying various operation menus, a music title lists, the information about music being reproduced (artist names, music titles, and so on) are displayed on the display block 206. The display block 206 is based on an LCD, a PDP, or an organic EL panel, for example.

The input block 204 provides input section for the user to execute various input operations. The input block 204 is based on a touch panel integrated with the display block 206. When the user executes an input operation through the input block 204, then a control signal corresponding to this input operation is generated and the generated control signal is outputted to the application processor 201. In response to the received control signal, the application processor 201 executes computation and control processing.

The communication block 205 executes communication with the above-mentioned content reproduction apparatus 100 installed in the vehicle. For the communication scheme of the communication block 205, Bluetooth (trademark), wireless HDMI (High Definition Multimedia Interface), Wi-Fi (Wireless Fidelity), millimeter-wave communication, wireless USB, or the like is available. In addition, the communication block 205 may be configured to be compatible with two or more wireless communication schemes. Further, the communication block 205 is configured to execute the transmission of data such as programs, in addition to video data and audio data.

The storage block 207 is made up of a mass storage media such as HDD and flash memory to store content data such as music data to be reproduced by the portable terminal 200. The music data is audio-compressed by any of known data compression schemes such as WAV (RIFF waveform Audio Format), MP3 (MPEG Audio Layer-3), or AAC (Advanced Audio Coding), for example, before being stored in the storage block 207. In addition, music information such as music artist names, album names, music titles, total reproduction time, and reproduction time information is stored in the storage block 207 as metadata of the music data. The music information may be obtained by use of CDDB (Compact Disc DataBase) for example. Further, the music information may be configured such that the user is able to set the music information as desired.

The network interface 208 executes data transmission and reception with external base stations for example on the basis of a predetermined protocol. Any one of communication schemes such as wireless LAN (Local Area Network), Wi-Fi, and 3G line, for example, may be used. The network interface 208 allows the portable terminal 200 to execute Internet connection and the talk with other persons, for example.

Various applications installed in the portable terminal 200 are executed by the application processor 201. In one embodiment of the present disclosure, the content reproduction apparatus 100 and the portable terminal 200 communicate with each other to share applications. For example, the content reproduction apparatus 100 provides a master device, while the portable terminal 200 provides a slave device. By wireless communication with the portable terminal 200, the content reproduction apparatus 100 has a content sharing trigger through dedicated protocol communication for transferring the information of both the content reproduction apparatus 100 and the portable terminal 200, thereby sharing the video content reproduced from disk recording media for example. For a specific example of an information share application, software "VNC Viewer" is known. Such an information share application allows the transmission of video content from the content reproduction apparatus 100 to the portable terminal 200 to display the transmitted video content on the portable terminal 200.

It should be noted that an information share application may be provided to the user as installed in the portable terminal 200 beforehand or the user may install an information share application in the portable terminal 200. Each information share application is sold by an application sale site on the Internet or provided or sold through application download services, for example. In addition, each information share application may be provided or sold as stored in an portable recording media such as an optical disk or a semiconductor memory.

It should be noted that a mobile telephone, a portable music player, or a tablet-type terminal, for example, may be used for the portable terminal 200, in addition to a smartphone. Further, the portable terminal 200 may have a camera function realized by an imaging block and an image processing block, for example.

[Arrangement and Control of Speakers]

Figure 3:
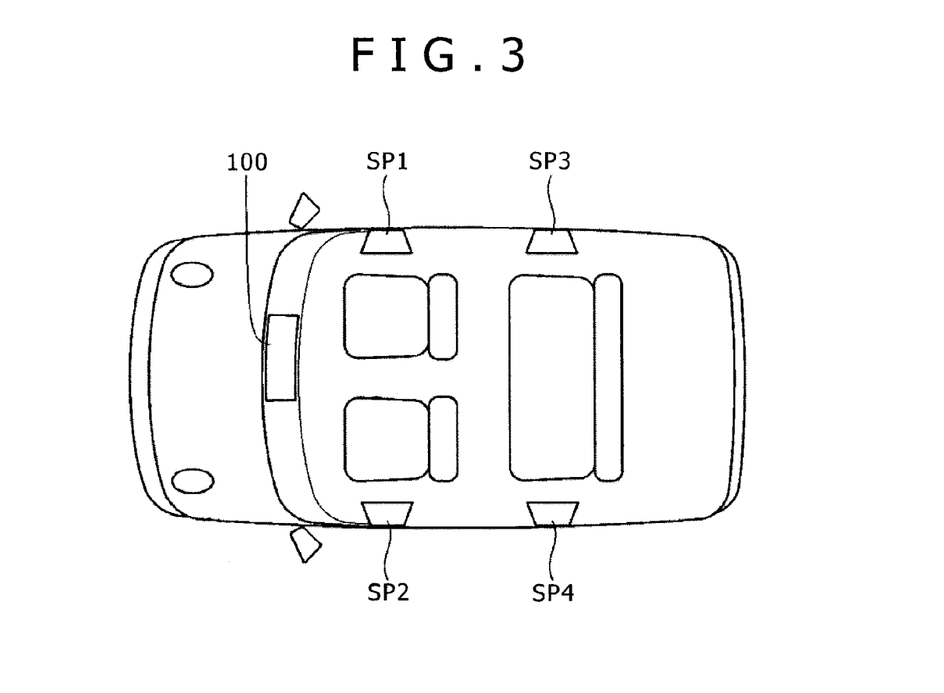
FIG. 3 a schematic diagram illustrating a relation in the arrangement of speakers in still another embodiment of the present disclosure.

As shown in FIG. 3, two or more speakers of the speaker group 105 connected to the content reproduction apparatus 100 are installed in a vehicle. To be more specific, a speaker SP1 is arranged in the proximity of the driver at the front seats, a speaker SP2 is arranged in the proximity of the passenger seat beside the driver seat, and speakers SP3 and SP4 are arranged at the right and left sides of the rear seats. These speakers SP1 through SP4 are connected with cables to the content reproduction apparatus 100 arranged in front of the driver seat.

Figure 4A:
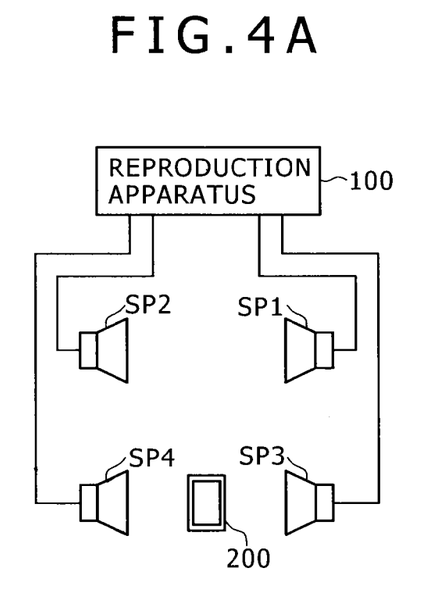
FIGS. 4A and 4B are schematic diagrams illustrating a relation in the arrangement of speakers and the portable terminal and a method of controlling the speakers.
Figure 4B:
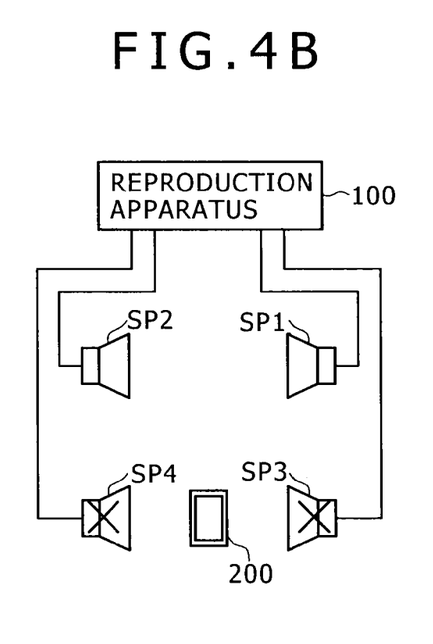

The following describes, as one example, a control operation for controlling audio reproduction from the speakers when a user having the portable terminal 200 is at a rear seat as shown in FIGS. 4A and 4B. A disk recording media, a DVD for example, is reproduced by the content reproduction apparatus 100 and the reproduced video is displayed by a display block associated with the content reproduction apparatus 100. In addition, because information share applications are installed in both the content reproduction apparatus 100 and the portable terminal 200, the reproduced video can be viewed on the screen of the portable terminal 200. In this shared state, as shown in FIG. 4A, all front and rear speakers SP1 through SP4 are turned on and the audio signal related with the video of a reproduced DVD is supplied to these speakers SP1 through SP4, thereby sounding the supplied audio signal.

On the other hand, if the user at a rear seat executes an application, a game application for example, other than the video share application on the portable terminal 200, it is required to prevent a reproduced video from being displayed on the screen of the portable terminal 200. Further, the sound from the speaker SP3 and the speaker SP4 arranged at the rear seats may become noise for the game-playing passenger. In this non-shared state, the output of sound from the speaker SP3 and the speaker SP4 are turned off (indicated by X) as shown in FIG. 4B. As a result, the reproduced audio of DVD becomes almost inaudible to the user at a rear seat, thereby preventing the reproduced audio from interfering the game playing. Not only in the case of execution of applications, but also in the case of blocking DVD reproduced video in order to assure passenger sleep, the reproduced audio can be suppressed. Turning off the speaker SP3 and the speaker SP4 may be realized by a method of localizing the sound image at the proximity of the front seats, a method of muting the audio input into these speakers, or a method of entering a reverse-phase audio signal to cancel an input audio signal, by use of the sound DSP.

[One Example of an Information Share Application]

Figure 5A:
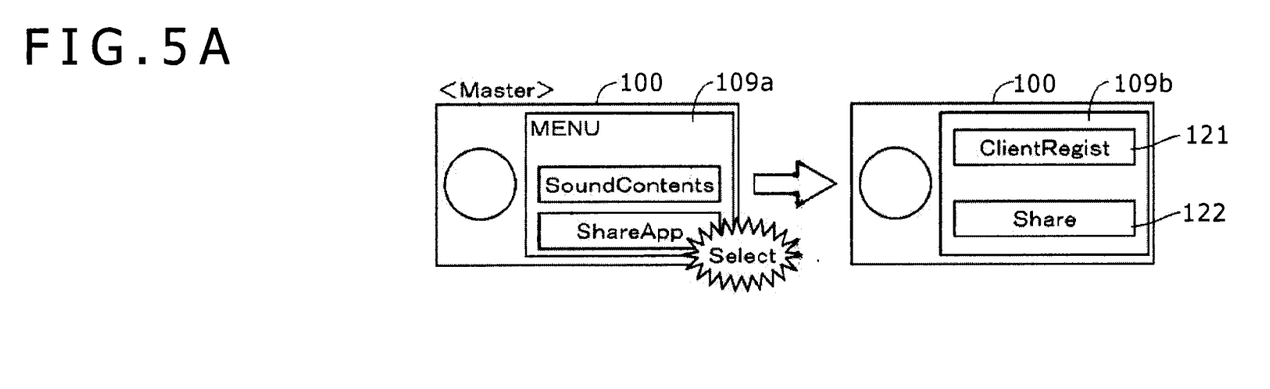
FIGS. 5A and 5B are schematic diagrams illustrating applications to be installed in devices practiced as a separate embodiment of the present disclosure.

In the content reproduction apparatus 100 in which an information share application is installed, a menu screen 109a as shown in FIG. 5A is displayed on the screen of the display block 109. In the menu screen 109a, the icon (ShareApp) of a shared application is selected by the user through an input operation from among two or more icons.

In accordance with this selective operation, the menu screen 109a of the display block 109 transitions to a screen 109b. In the screen 109b, a registration icon 121 and a share icon 122 are displayed. When the user selects the registration icon 121, a search for a peripheral device is executed and the found peripheral device is registered. In addition, when the user selects the share icon 122, a content shared state occurs with the registered peripheral device.

Figure 5B:
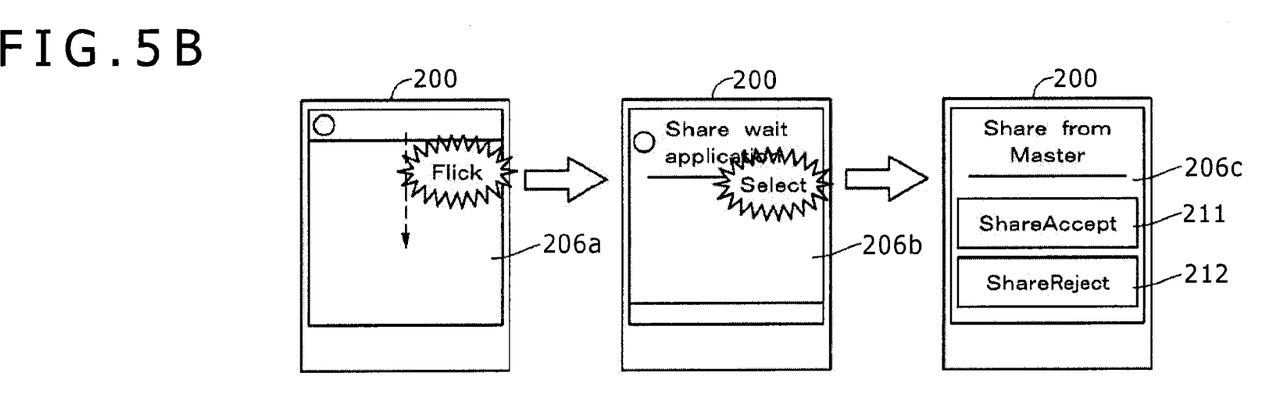

In the portable terminal 200 in which an information share application is installed, when the screen 206a of the display block (touch panel) 206 is flicked down for example as shown in FIG. 5B, then the screen (or page) 206a moves to the screen 206b. On the screen 206b, an application name (Share wait application) is displayed. When the user selects the display of this application name by tap, then the screen 206b moves to a screen 206c. In the screen 206c, a menu name (Share from Master), an accept icon 211, and a reject icon 212 are displayed.

When the accept icon 211 is selectively tapped, content sharing with the content reproduction apparatus 100 is permitted. When the accept icon 211 is tapped, the information about content share acceptance is transmitted to the content reproduction apparatus 100. If the reject icon 212 is selectively tapped, the content sharing with the content reproduction apparatus 100 is rejected. When the icon 212 is tapped, the information about content share rejection is transmitted to the content reproduction apparatus 100.

[Processing to be Executed at Device Registration]

Figure 6:
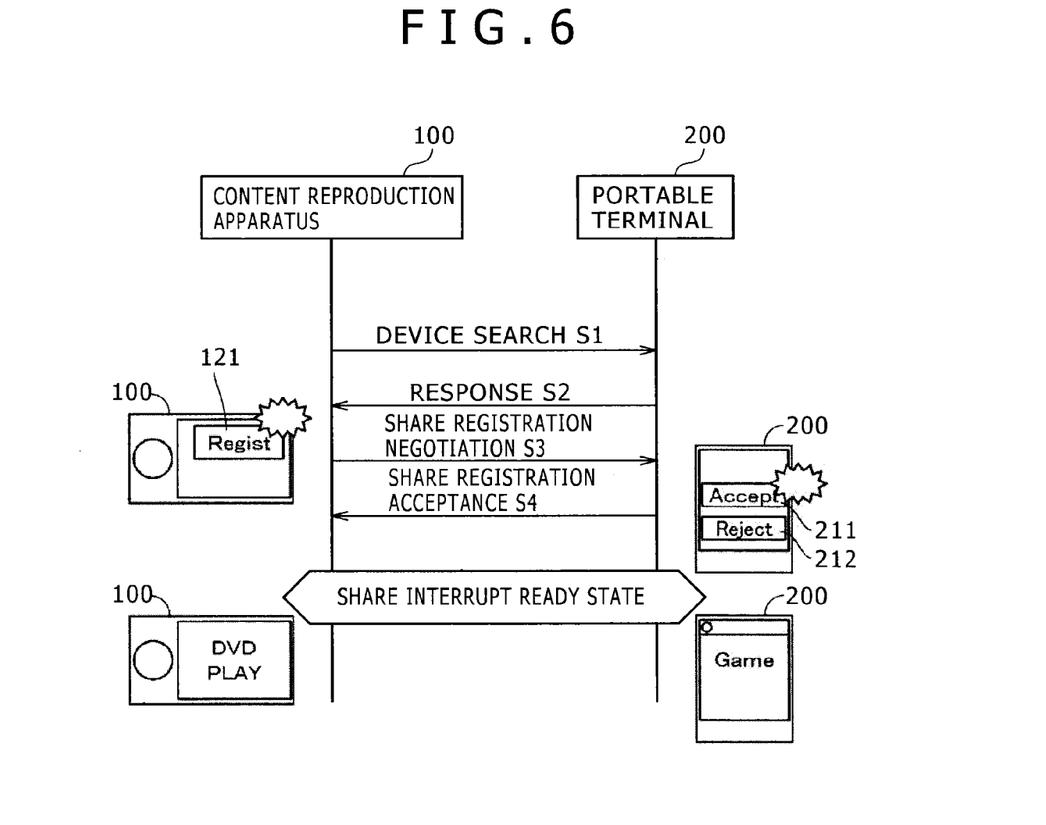
FIG. 6 is a sequence chart indicative of operations that are executed at the registration of devices practiced as a still separate embodiment of the present disclosure.

The following describes device registration processing with reference to the flow chart shown in FIG. 6. It is assumed that application software be installed in the content reproduction apparatus 100 and the portable terminal 200 in advance. When an application is activated, the content reproduction apparatus 100 executes device search processing S1. In response to device search processing S1, the portable terminal 200 executes processing S2 for making a response. When the response is received, the registration icon 121 is displayed on the screen of the content reproduction apparatus 100.

When the registration icon 121 is selectively tapped, share registration negotiation S3 is executed to establish connection between the content reproduction apparatus 100 and the portable terminal 200 for content sharing. When the connection is established, the accept icon 211 and the rejection icon 212 are displayed on the portable terminal 200 as described above. If the user of the portable terminal 200 accepts sharing, the user taps the accept icon 211. When the accept icon 211 is thus selected, transmission processing S4 of share registration acceptance is executed on the content reproduction apparatus 100 by the portable terminal 200.

When the share registration acceptance from the portable terminal 200 is received by the content reproduction apparatus 100, the content reproduction apparatus 100 gets in a share interrupt ready state. In the example shown in FIG. 6, in the share interrupt ready state, the content reproduction apparatus 100 executes DVD reproduction and the portable terminal 200 activates a game application. In the share interrupt ready state, an audio signal reproduced from a DVD is sounded through the speakers SP1 and SP2 in the proximity of the front seats and is not sounded through the speakers SP3 and SP4 for the rear seats. However, in the state where no shared application is activated, the user manually controls the sounding of audio signal from each of the speakers. It should be noted that, if the reject icon 212 is selected, the share interrupt ready state is not entered.

[One Example of Processing to be Executed at the Time of Content Sharing]

Figure 7:
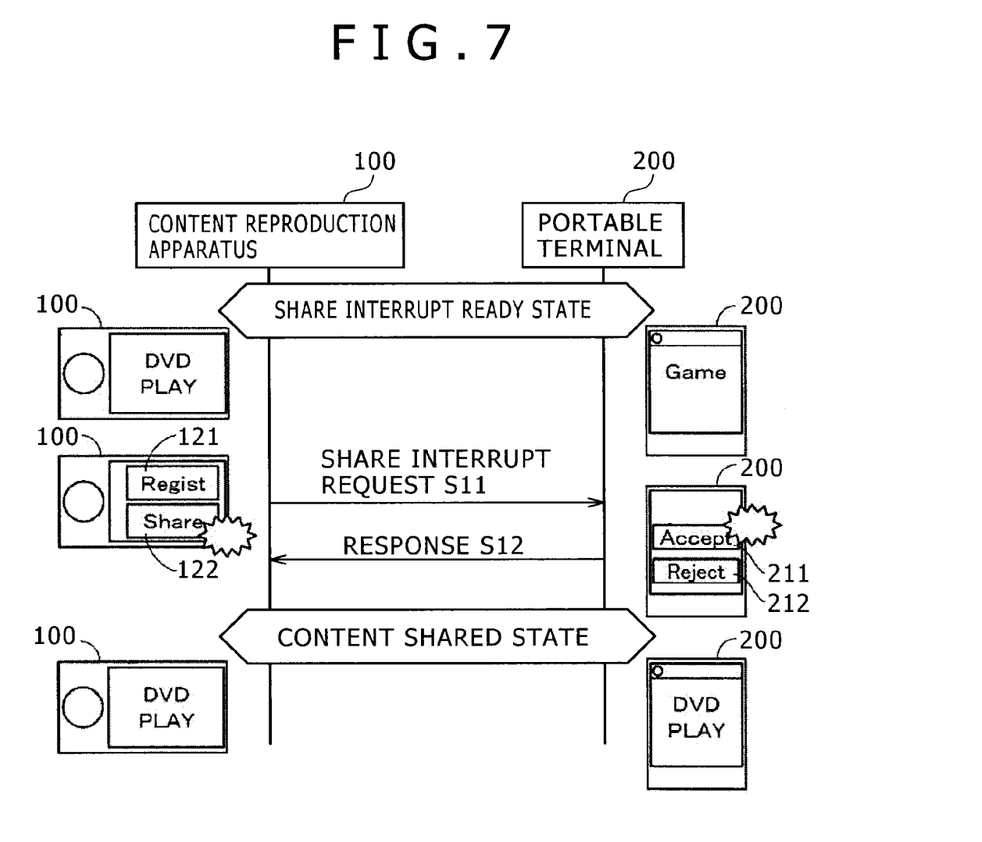
FIG. 7 is another sequence chart indicative of operations that are executed at the registration of devices practiced as yet another embodiment of the present disclosure.

The following describes the processing to be executed at the time of content sharing with reference to the flowchart shown in FIG. 7. As described above, the following assumes that the share interrupt ready state be on. When the content reproduction apparatus 100 is executing a DVD reproduction operation, the menu screen is opened to activate a shared application. Then, when the share icon 122 is selected, transmission processing S11 for requesting a share interrupt is executed on the portable terminal 200.

When the portable terminal 200 receives this request, the accept icon 211 and the reject icon 212 are displayed on the screen of the portable terminal 200 in which a game application is active. In the example shown in FIG. 7, when the user taps the accept icon 211, acceptance is selected. A response generated as a result of this accept operation is transmitted by transmission processing S12.

In the portable terminal 200, when share acceptance is selected by the user and the response corresponding to the selection is transmitted to the content reproduction apparatus 100, thereby entering the content shared state. In the content shared state, a reproduction screen of the DVD being reproduced in the content reproduction apparatus 100 is displayed on the display screen of the portable terminal 200. Consequently, video is shared between the content reproduction apparatus 100 and the portable terminal 200.

The audio signal related with the DVD reproduction screen is sounded from the speakers SP3 and SP4 in the proximity of the user at the rear seat, so that the user is able to hear the sound from the speakers SP3 and SP4 while viewing the reproduced screen of the portable terminal 200. Accordingly, the content reproduction apparatus 100 and the portable terminal 200 share the video and audio. Further, in the content shared state, setting may be done so as to mute the sound from the speaker 203 of the portable terminal 200.

[Another Example of Processing to be Executed at the Time of Content Sharing]

In the example shown in FIG. 7, video content is shared between the content reproduction apparatus 100 and the portable terminal 200 upon an interrupt request from the content reproduction apparatus 100. On the other hand, a shown in FIG. 8, a shared application may be activated in the portable terminal 200 to cause a content shared state from the side of the portable terminal 200.

Figure 8:
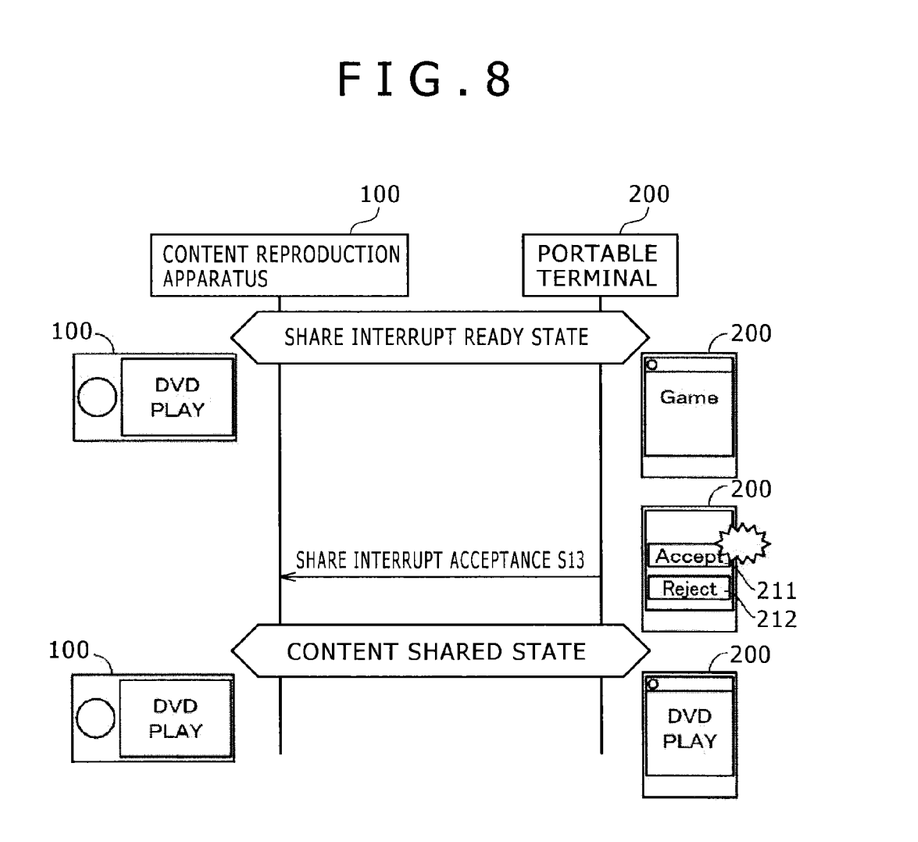
FIG. 8 is still another sequence chart indicative of operations that are executed at the sharing of content practiced as a different embodiment of the present disclosure.

In the share interrupt ready state, when a shared application is activated in the portable terminal 200 as described above with reference to FIG. 5B, a page in which the accept icon 211 and the reject icon 212 are displayed is displayed. When the user selects the accept icon 211, transmission processing S13 for accepting the share interrupt is executed.

When the content reproduction apparatus 100 receives the share interrupt acceptance from the portable terminal 200, the content shared state is entered. In the content shared state, the reproduction screen of the DVD being reproduced in the content reproduction apparatus 100 is displayed on the display screen of the portable terminal 200. Consequently, video is shared between the content reproduction apparatus 100 and the portable terminal 200. As described, in the share interrupt ready state, operating either the content reproduction apparatus 100 or the portable terminal 200 allows the sharing of the video content being reproduced in the content reproduction apparatus 100.

[Processing to be Executed at the Time of Content Share Rejection]

Figure 9:
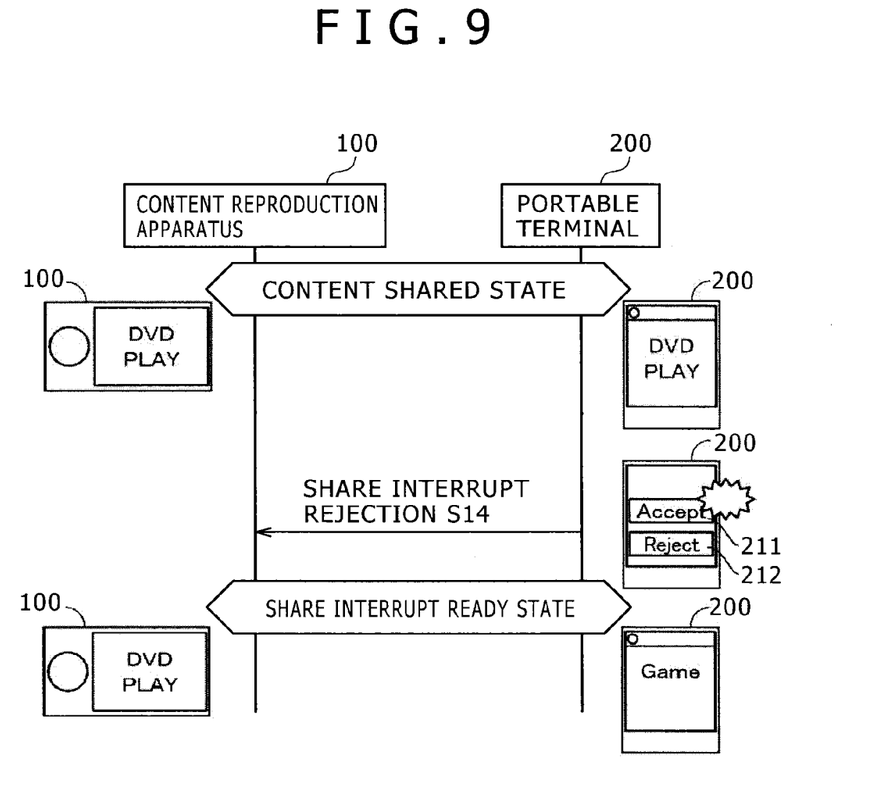
FIG. 9 is yet another sequence chart indicative of operations that are executed when an operation mode is shifted from a content shared state to a content non-shared state practiced as still different embodiment of the present disclosure.

As described above, in the content share ready state, the portable terminal 200 may be operated to clear the shared state to provide the share interrupt ready state. As shown in FIG. 9, in the content shared state, both the content reproduction apparatus 100 and the portable terminal 200 display a reproduced image of a DVD for example on the respective display blocks. As shown in FIG. 4A, an audio signal related with the reproduced image is reproduced from all speakers SP1 through SP4 in the vehicle.

In the content shared state, if the user of the portable terminal 200 wants to stop the sharing of content, then, in the portable terminal 200, a shared application is activated to display a page including the accept icon 211 and the reject icon 212. When the user selects the reject icon 212, the content shared state in the portable terminal 200 is cleared, upon which transmission processing S14 for share interrupt rejection is executed.

When the content reproduction apparatus 100 receives the share interrupt rejection from the portable terminal 200, the shared state is cleared and the share interrupt ready state is entered. In this case, of the speakers arranged in the vehicle, audio reproduction from the speakers SP3 and SP4 in the proximity of the rear seats is stopped. The speakers SP3 and SP4 are turned off by a method of localizing the sound image at the proximity of the front seats, a method of muting the audio input into these speakers, or a method of entering a reverse-phase audio signal to cancel an input audio signal. In addition, if the sound output from the speaker 203 of the portable terminal 200 is set for stop, then the speaker 203 of the portable terminal 200 becomes ready for audio output in coordination with the clearing of the content shared state.

2. VARIATIONS

Embodiments of the present disclosure have been specifically described above. However, it should be noted that the present disclosure is not limited to the embodiments described above; the present disclosure may be embodied in a variety of variations based on the technical concept of the present disclosure.

For example, in one embodiment described above, an audio signal is reproduced from all speakers SP1 through SP4 when the content reproduction apparatus 100 and the portable terminal 200 of the user at the rear seat are in the shared state as described with reference to FIGS. 4A and 4B. On the other hand, in the non-shared state as with the share interrupt ready state, the reproduction of an audio signal from the speakers SP3 and SP4 are disabled.

Figure 10A:
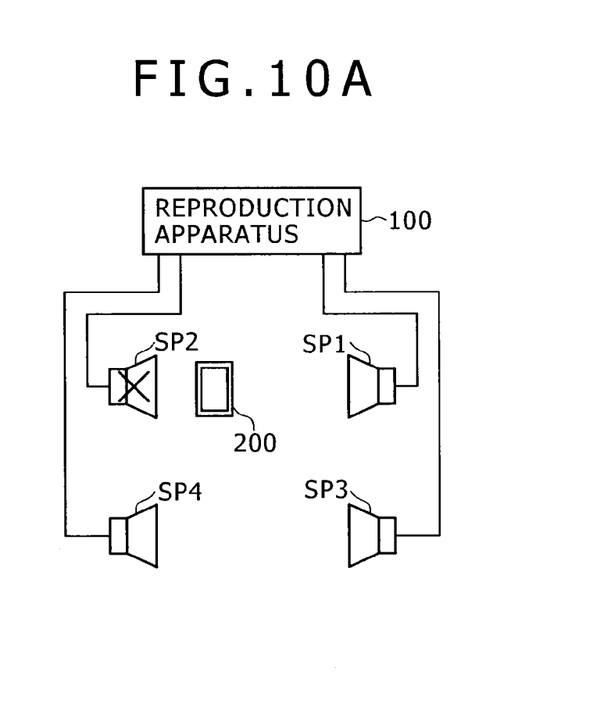
FIGS. 10A and 10B are schematic diagrams illustrating a relation in the arrangement between speakers and a portable terminal and a method of controlling the speakers practiced as yet different embodiment of the present disclosure.
Figure 10B:
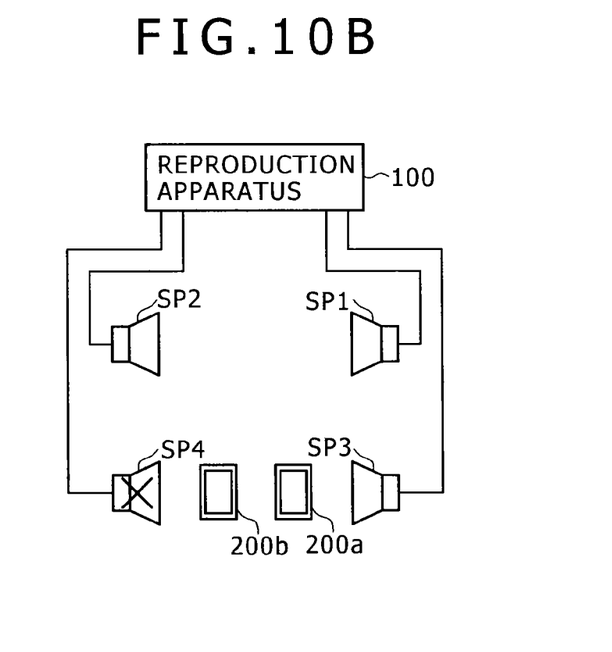

It should be noted that a control method, as shown in FIGS. 10A and 10B, for controlling the speakers SP1 through SP4 is available. In an arrangement shown in FIG. 10A, a user having at the front seat by the driver's seat has the portable terminal 200. In the state where the content reproduction apparatus 100 and the portable terminal 200 are not in the shared state, the output sound from the speaker SP2 in the proximity of the user is muted (indicated by X), thereby preventing the sound from the speaker SP2 from becoming offensive to the user.

Further, in the present disclosure, as shown in FIG. 10B, if two portable terminals 200a and 200b are used at the rear seats, the output of sound from the speakers may be controlled in accordance with the shared state or non-shared state of each portable terminal. As described before with reference to FIG. 6, in share registration negotiation S3, the information about the positions of the portable terminals 200a and 200b is transmitted to the content reproduction apparatus 100 in addition to the processing for content sharing with the content reproduction apparatus 100.

For example, in the case of the portable terminal 200a, the information indicative of the position of the rear right is transmitted to the content reproduction apparatus 100; in the case of the portable terminal 200b, the information indicative of the rear left is transmitted to the content reproduction apparatus 100. The share/non-share relation between the content reproduction apparatus 100 and the portable terminal 200a and the share/non-share relation between the content reproduction apparatus 100 and the portable terminal 200b may be set independently. Therefore, a case may occur in which the content reproduction apparatus 100 and the portable terminal 200a are in the shared state while the content reproduction apparatus 100 and the portable terminal 200b are in the non-shared state.

In such a case, as shown in FIG. 10B, the audio output from the speaker SP4 at the left of the rear seat (namely, the side of the user having the portable terminal 200b) is turned off (indicated by X). To be more specific, the speakers SP3 and SP4 for the rear seats can be controlled independently. Consequently, the user at the rear left seat becomes almost unaffected by the sound reproduced from DVD, being able to enjoy gaming for example without noise interference. Not only in the case of execution of another application, but also in the case of blocking DVD reproduced video in order to assure passenger sleep, the reproduced audio can be suppressed.

In the above-mentioned embodiments of the present disclosure, the present disclosure is applied to on-vehicle apparatuses. However, the present disclosure is also applicable to video content sharing between separated rooms in a home theater system. Further, the present disclosure is applicable to the sharing of such video content other than the video reproduced from DVD as video available on the Internet for example.

It should be noted that the present disclosure may take the following configuration for example.

(1) A content reproduction apparatus including:
a reproduction block configured to reproduce video content;
a display block configured to display the reproduced video content;
a communication block configured to transmit the video content to a portable reproduction apparatus by wireless communication;
a speaker block having at least one first speaker located in proximity and at least one second speaker located in the proximity of the portable reproduction apparatus; and
an audio output control block configured to control a reproduction state of the speaker block,
wherein, in a state where the video content is displayed on the display block, if the portable reproduction apparatus is in a content share state where the portable reproduction apparatus displays the video content, each of the first speaker and the second speaker reproduces audio content related with the video content and,
in a content non-share state, the audio output control block controls audio output such that the second speaker does not reproduce audio content related with the video content.

(2) The content reproduction apparatus according to (1) above, wherein the content reproduction apparatus is an in-vehicle content reproduction apparatus in which the first speaker is located in the proximity of a front seat of a vehicle and the second speaker is located in the proximity of a rear seat of the vehicle.

(3) The content reproduction apparatus according to (1) or (2) above, wherein, a share interrupt request is transmitted to the portable reproduction apparatus in the content non-share state, and, if a response to the request is received from the portable reproduction apparatus, the content non-share state transitions to the content share state.

(4) The content reproduction apparatus according to any one of (1), (2), and (3) above, wherein, if a share acceptance is received from the portable reproduction apparatus in the content non-share state, the content non-share state transitions to the content share state.

(5) The content reproduction apparatus according to any one of (1), (2), (3) and (4) above, wherein, if a share rejection is received from the portable reproduction apparatus in the content share state, the content share state transitions to the content non-share state.

(6) The content reproduction apparatus according to any one of (1), (2), (3), (4), and (5) above, wherein the second speaker includes a third speaker and a fourth speaker;
the third speaker and the fourth speaker are located in the proximity of a first of portable reproduction apparatus and a second of the portable reproduction apparatus respectively; and
the first portable reproduction apparatus and the second portable reproduction apparatus independently have the content share state and the content non-share state.

(7) A content reproduction system including:
a content reproduction apparatus having
a reproduction block configured to reproduce video content,
a first display block configured to display the reproduced video content,
a first communication block configured to transmit the video content to a portable reproduction apparatus by wireless communication,
a speaker block having at least one first speaker located in proximity and at least one second speaker located in the proximity of the portable reproduction apparatus, and
an audio output control block configured to control a reproduction state of the speaker block; and
a portable terminal having
a second communication block configured to receive the video content by wireless communication, and
a second display block configured to display the received video content,
wherein, in the content share state where, in a content share state where the portable reproduction apparatus displays the video content on the second display block, each of the first speaker and the second speaker reproduces audio content related with the video content and,
in a content non-share state, the audio output control block controls audio output such that the second speaker does not reproduce audio content related with the video content.

The present technology contains subject matter related to that disclosed in Japanese Priority Patent Application JP 2012-058229 filed in the Japan Patent Office on Mar. 15, 2012, the entire content of which is hereby incorporated by reference.

What is claimed is:

1. A content reproduction apparatus comprising:
a reproduction block configured to reproduce video content;
a display block configured to display the reproduced video content;
a communication block configured to transmit the video content to a portable reproduction apparatus by wireless communication;
a speaker block having at least one first speaker located in proximity and at least one second speaker located in the proximity of the portable reproduction apparatus; and
an audio output control block configured to control a reproduction state of the speaker block,
wherein, in a state where the video content is displayed on the display block, if the portable reproduction apparatus is in a content share state where the portable reproduction apparatus displays the video content, each of the first speaker and the second speaker reproduces audio content related with the video content and,
in a content non-share state, the audio output control block controls audio output such that the second speaker does not reproduce audio content related with the video content.

2. The content reproduction apparatus according to claim 1, wherein the content reproduction apparatus is an in-vehicle content reproduction apparatus in which the first speaker is located in the proximity of a front seat of a vehicle and the second speaker is located in the proximity of a rear seat of the vehicle.

3. The content reproduction apparatus according to claim 1, wherein, a share interrupt request is transmitted to the portable reproduction apparatus in the content non-share state, and, if a response to the request is received from the portable reproduction apparatus, the content non-share state transitions to the content share state.

4. The content reproduction apparatus according to claim 1, wherein, if a share acceptance is received from the portable reproduction apparatus in the content non-share state, the content non-share state transitions to the content share state.

5. The content reproduction apparatus according to claim 1, wherein, if a share rejection is received from the portable reproduction apparatus in the content share state, the content share state transitions to the content non-share state.

6. The content reproduction apparatus according to claim 1, wherein the second speaker includes a third speaker and a fourth speaker;
   the third speaker and the fourth speaker are located in the proximity of a first of portable reproduction apparatus and a second of the portable reproduction apparatus respectively; and
   the first portable reproduction apparatus and the second portable reproduction apparatus independently have the content share state and the content non-share state.

7. A content reproduction system comprising:
   a content reproduction apparatus having
      a reproduction block configured to reproduce video content,
      a first display block configured to display the reproduced video content,
      a first communication block configured to transmit the video content to a portable reproduction apparatus by wireless communication,
      a speaker block having at least one first speaker located in proximity and at least one second speaker located in the proximity of the portable reproduction apparatus, and
      an audio output control block configured to control a reproduction state of the speaker block; and
   a portable terminal having
      a second communication block configured to receive the video content by wireless communication, and
      a second display block configured to display the received video content;
   wherein, in the content share state where, in a content share state where the portable reproduction apparatus displays the video content on the second display block, each of the first speaker and the second speaker reproduces audio content related with the video content and,
   in a content non-share state, the audio output control block controls audio output such that the second speaker does not reproduce audio content related with the video content.

* * * * *